Dec. 19, 1950  J. R. BLAND  2,534,695
SLIDE RULE
Original Filed Oct. 17, 1944

Inventor:
James R. Bland
By J. Russell Juten
Attorney.

Patented Dec. 19, 1950

2,534,695

UNITED STATES PATENT OFFICE 2,534,695

SLIDE RULE

James R. Bland, Eastport, Md., assignor to Keuffel & Esser Company, Hoboken, N. J., a corporation of New Jersey Original application October 17, 1944, Serial No. 559,020, now Patent No. 2,422,649, dated June 17, 1947. Divided and this application April 3, 1947, Serial No. 739,135

1 Claim. (Cl. 235—70)

Figure 1:
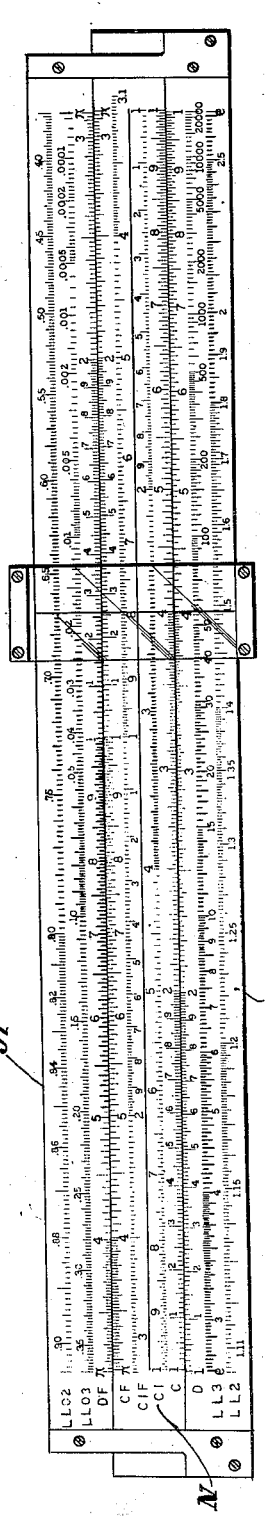
Figure 2:
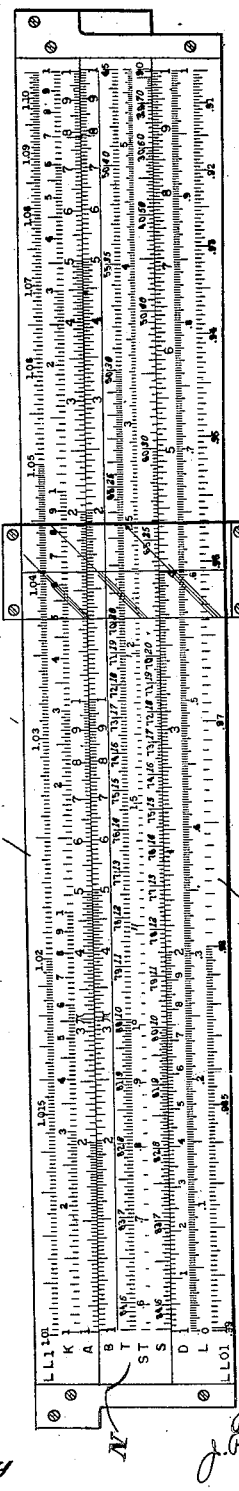

This invention relates to slide rules and has as its object to provide a rule of enhanced power and in the use of which by a process requiring generally one but no more than one movement either of the hairline or of the slide for each number in the expression to be computed. The improved capabilities of the new rule can be best explained with reference to an actual embodiment such as is shown by way of illustration in the accompanying drawing in which:

Figure 1 is a view of one face of a slide rule in accordance with the invention and Figure 2 is a view of the other face.

As a matter of convenient reference, the face of the rule shown in Figure 1 will hereinafter be considered to be the front face and the face shown in Figure 2 to be the rear face. I have chosen to show the invention as applied to a rule which is the same in mechanical structure as that shown in Patent No. 2,170,144, granted August 22, 1939. As in the said patent, reference letters H and J designate parallel bars secured together by end plates so as to provide a slotted body in the slot of which a slide N is relatively movable. In the said patent, the reference letter X designates a runner having transparent faces carrying a hairline Y. For the sake of clarity, the runner has been omitted from the present drawings.

The slide N, Figure 1, is provided with the usual C scale, graduated in accordance with the logarithms of numbers from 1 to 10, and of unit length. The body carries the usual D scale which is exactly the same as the C scale and these two scales are herein considered to be basic scales since all other scales are directly associated with them so that all slide rule operations are most easily explainable by means of them.

Above the C scale, as viewed in Figure 1, is a CI scale which is identical and co-extensive with the C scale except that it is inverted with respect thereto. The term "co-extensive" as used herein includes the meaning of registry, i. e., the inclusion within common parallel terminal lines, insofar as effective extent is concerned.

Above the CI scale is the CIF scale which is the same as the CI scale except that it is folded at $\pi$, while the immediately adjacent CF scale is identical with the C scale except that it is folded at $\pi$. The immediately adjacent DF scale, on the body, is identical with the CF scale.

On its rear face, the slide carries a B scale which is co-extensive with the C scale and is graduated in accordance with the logarithms of numbers from 1 to 100. Below the B scale, as viewed in Figure 2, the slide carries the co-extensive trigonometric scales T, ST and S. The T scale is graduated in accordance with the logarithms of the values of the natural tangents from 5° 43' to 45°, the ST scale is graduated in accordance with the logarithms of the values of the natural sines of the angles from 34' to 5° 43', while the S scale is like the ST scale except that its range is from 5° 43' to 90°.

On its rear face, the body carries K, A, D and L scales all co-extensive with the first-mentioned D scale. The K scale is graduated in accordance with the logarithms of numbers from 1 to 1000, the A scale is identical with the B scale, hereinbefore mentioned, the D scale is identical with the first-mentioned D scale, and the L scale is uniformly graduated in ten main primary divisions and appropriate subdivisions.

The LL scale, as here shown, is in three sections. LL1, LL2 and LL3, each of full unit length, of which LL1 appears on the rear face, and LL2 and LL3 appear on the front face. Each section is co-extensive with the C and D scales and the entire scale is graduated in accordance with the logarithms of the logarithms of numbers greater than unity. Finally, the rule is provided with an LL0 scale in three sections each of full unit length of which section LL01 appears on the rear face and sections LL02 and LL03 appear on the front face. The sections of this scale are each co-extensive with the basic scales and the scale as a whole is graduated in accordance with the logarithms of the co-logarithms of the positive numbers less than unity, or, to express it differently, in accordance with the logarithms of the logarithms of the reciprocals of the numbers of the LL scale.

The range selected for the LL0 scales corresponds to the range used for the LL scales. In the illustrated embodiment $e$ and $e^{-1}$ are opposite an index of the D scale. In the case of a rule in which it is necessary to conserve space on the face of the rule, a different range of values could be selected for the LL scales and a corresponding range would be selected for the LL0 scales. In such a case, some number other than $e$ would be placed opposite the index of D, front face. The choice in this matter would depend upon a selection of the most useful range of values on the LL and on the LL0 scales. For example, if a single LL scale section were to be used, the range of values chosen might be from 1.585 (approximately) to 100. In this case, the first of these numbers would be set opposite the left index of D, while the 100 would be set opposite the right index of D. With this choice for a single line LL scale, the co-extensive single line LLO scale would have the range of 0.631 (approximately) to 0.01. The first of these numbers would be placed opposite the left index of D, while the point 0.01 would be set opposite the right index of D.

As here shown, the LLO scale is graduated in accordance with the logarithms of the co-logarithms of positive numbers between $e^{-0.01}$ equals 0.9900, and $e^{-0.1}$ equals 0.9048, $e^{-0.1}$ and $e^{-1}$ equals 0.3679 and $e^{-1}$ and $e^{10}$ equals 0.000052, respectively. These graduations are so spaced that, like the LL scale, the trigonometric scales and the K, A, B, L, DF, CF, CIF and CI scales, the LLO scale is directly associated with numbers on the basic scales C and D. By "directly associated," we mean that when the rule is closed (i. e. when the indices are aligned) and the hairline is pushed to a value on any scale other than the C and D scales, the value of the function of this scale associated with the marked value is directly readable at the hairline on scale C. For example, in the case of the trigonometric scales, if the hairline is pushed to an angle on the S scale, the sine of that angle will be marked at the hairline on the C scale; if the hairline is pushed to a number on the B scale, the square root of the number will be marked at the hairline on the C scale; if the hairline is pushed to a number on the CI scale, the reciprocal of that number will be marked at the hairline on the C scale; and if the hairline is pushed to a number on the CF scale, the hairline will mark on the C scale the number divided by $\pi$.

A great advantage arises from the direct association of the LLO scale with the basic scales C and D instead of with the scales A and B, which latter has been the practice heretofore as illustrated, for example, in the above mentioned patent. Every scale outside of the C and D scales is directly associated with the C and D scales. Consequently, the rules governing the placing of the decimal point and the result arrived at in the use of the LLO scale are very similar to those governing the placing of the decimal point in a result arrived at in the use of the LL scales. Operating rules of a very unlike and therefore confusing nature govern the use of the two corresponding sets of Log Log scales in prior art rules of the type shown in the said patent.

The new LLO scale gives additional power to the rule and makes the operator more accurate in making settings, since the principles are similar to those involved in other settings, and this simplicity is achieved by the described association of the LLO scale with the basic C and D scales. The operator has the advantage of being able to obtain negative powers of numbers greater than 1, and negative powers of numbers less than 1 simultaneously. The LL and LLO scales may be used in cooperation with the C and D scales in one operation. For example, if the operator wishes to find $4^{-2}$, he sets the left index of C opposite 4 on the LL3 scale, pushes the hairline to 2 on the C scale, and at the hairline reads 0.062 on the LLO3 section.

The advantages arising from the new association of scales will be evident from the following examples:

*Example 1.*—Evaluate: $3.47^{0.1}$, $3.47^{-0.1}$, $3.47^{0.01}$, and $3.47^{-0.01}$.

*Solution.*—Set hairline on glass indicator to 3.47 on scale LL3

At hairline on LL2 read $3.47^{0.1}=1.1325$
At hairline on LLO2 read $3.47^{-0.1}=0.883$
At hairline on LL1 read $3.47^{0.01}=1.0125$
At hairline on LLO1 read $3.47^{-0.01}=0.9877$

*Example 2.*—Find the logarithms to the base $e$ (=2.7183 approximately) of the numbers 1.135, and its reciprocal 0.883, 1.0125, and its reciprocal 0.9877.

*Solution.*—Set hairline on glass indicator to 1.135 of scale LL2

At hairline on D scale read $\log_e 1.1325$ (found on LL2) $=0.1242$

At hairline on D scale read $\log_e 0.883$ (found on LLO2) $=-0.1242$

At hairline on D scale read $\log_e 1.0125$ (found on LL1) $=0.01242$

At hairline on D scale read $\log_e 0.98765$ (found on LLO1) $=-0.01242$

Observe in Example 1, that the answers for like exponents were found on like numbered scales, and in Example 2 that the decimal point in the answers were similarly placed when the answers were derived from like numbered scales. In prior art rules, no such simplicity obtained because the scales marked LLOO and LLO were read against the A and B scales whereas the scales marked LL1, LL2, and LL3 were read against the C and D scales for practically every important problem. It was a matter of common experience, that students had great difficulty in using the scales marked LLOO and LLO on prior art rules because of difficulties arising because the A and B scales were repeated scales. These difficulties do not arise in the operation of the slide rule of the present invention, since like rules of operation apply to both sets of the Log Log scales.

In the use of the new slide rule most practical applications of the Log Log scales are operated in conjunction with the C and D scales. However many important applications involve their use with other scales. In every case likeness of method of operation and of placing the decimal point obtain when the rule of this invention is employed. The following examples will illustrate this fact.

*Example 3.*—Evaluate $e^{\sin 30°}$ and $e^{-\sin 30°}$

*Solution.*—Using the rule of the present invention, close the rule, that is, set the left mark numbered 1 on scale C opposite the same numbered left mark of scale D, push the hairline on the glass indicator to 30° on scale S, at the hairline on scale LL2 read 1.65 and on scale LLO2 read $e^{-\sin 30°}=0.606$. Observe that like numbered Log Log scales LL2 and LLO2 were used.

*Example 4.*—Evaluate $5^{\cos 70°}$ and $5^{-\cos 70°}$.

*Solution.*—Opposite 5 on scale LL3 draw left index of C, push hairline to 70° (red) on scale S, at the hairline on LL2 read $1.734 = 5^{\cos 70°}$ and at the hairline read $5^{-\cos 70°} = 0.577$ on LLO2.

*Example 5.*—Evaluate $0.2^{\tan 25°}$ and $0.2^{-\tan 25°}$.

*Solution.*—Opposite 0.2 on scale LLO3, set 1 of scale C, push hairline to 25° on scale T, At hairline read $0.2^{\tan 25°}=0.472$ on scale LLO2
At hairline read $0.2^{-\tan 25°}=2.12$ on scale LL2.

*Example 6.*—Evaluate $$0.15^{\frac{1}{5.2}} \quad \text{and} \quad 0.15^{\frac{-1}{5.2}}$$

*Solution.*—Draw index of CI opposite 0.15 scale LLO3, push hairline to 5.2 on CI, At hairline read $0.15^{\frac{1}{5.2}}=0.694$ on scale LLO2

At hairline read $(0.15)^{-\frac{1}{5.2}}=1.44$ on scale LL2

*Example 7.*—Evaluate $0.80\sqrt{5}$ and $0.80-\sqrt{5}$

*Solution.*—Draw left index of B opposite 0.80 on scale LLO2, push hairline to 5 on left half of B, At hairline read $0.80\sqrt{5}=0.607$ on scale LLO2,
At hairline read $0.80-\sqrt{5}=1.647$ on LL2.

*Example 8.*—Evaluate $$e^{-3\sqrt{33}} \text{ and } e^{3\sqrt{33}}$$

*Solution.*—Push the hairline to 33 on the middle K scale,

At hairline read $e^{-3\sqrt{33}}=.0404$ on LLO3.

At hairline read $e^{3\sqrt{33}}=24.7$ on LL3.

*Example 9.*—Evaluate $$e^{-\text{anti-log}_{10}6.24} \text{ and } e^{+\text{anti-log}_{10}6.24}$$

*Solution.*—Push the hairline to .624 on scale L

At hairline read $e^{-\text{anti-log}_{10}6.24}=0.656$ on scale LLO2

At hairline read $e^{\text{anti-log}_{10}6.24}=1.524$ on scale LL2.

*Example 10.*—Evaluate $2.1^{6/\pi}$ and $2.1^{-6/\pi}$

*Solution.*—Draw right index of CF to 2.1 of LL2, push the hairline to 6 of CF

At hairline read $2.1^{6/\pi}=4.12$ on LL3

At hairline read $2.1^{-6/\pi}=0.242$ on LLO3.

*Example 11.*—Evaluate $$(0.25)^{\frac{1}{0.2\pi}} \text{ and } (0.25)^{\frac{1}{-0.2\pi}}$$

*Solution.*—Draw index of CIF opposite .25 of LLO3 push hairline to 2 of CIF

At hairline read $(0.25)^{\frac{1}{0.2\pi}}=0.11$ on LLO3

At hairline read $(0.25)^{\frac{1}{-0.2\pi}}=9.1$ on LL3

The examples given above show the same likeness of operation and of placing the decimal point for the Log Log scales in conjunction with each of the other scales on the rule. Examples for the A, D, DF, and ST scales are not given since they would duplicate in principal examples already given.

The slide rule of the present invention has more power than the prior rules as regards the Log Log scales. For example, the expression $0.2^{-\tan 25°}$ occurring in Example 5 could not be evaluated with a single setting of the slide on the prior art slide rules, neither could such expressions as $2.9^{-0.3}$ and $0.29^{-0.31}$. These expressions involve the use of scales LL1, LL2 and LL3 in conjunction with the C scale and the scales LLO1, LLO2, and LLO3 on the rule of this invention and are easily evaluated with a single setting of the slide. Thus to evaluate $2.9^{-0.3}$ Draw the index of C opposite 2.9 on LL3,
Opposite 3 on C read $2.9^{-0.3}=0.726$ on LLO2 and to evaluate $0.29^{-0.31}$

Draw the index of C opposite 0.29 on LLO3
Opposite 31 on C read $0.29^{-0.31}=1.467$ on LL2.

Hyperbolic functions are being used more and more in engineering practice. With the new LLO1, LLO2, and LLO3 scales in conjunction with the scales marked LL1, LL2, and LL3, it is a simple matter to find the value of various hyperbolic functions. Thus to find sinh 2 and cosh 2, push the hairline to 2 on scale D and read at the hairline on LL3 7.39 and on LLO3 0.135. Hence $\sinh 2 = \frac{1}{2}(7.39-0.135)=3.627$ and $\cosh 2 = \frac{1}{2}(7.39+0.135)=3.762$. It is to be observed in this process that sinh 2 and cosh 2 were easily obtained since both the numbers 7.39 and 0.135 were found at once on Log Log scales LL3 and LLO3 having like numbers when the hairline was pushed to 2 on scale D. With the prior art slide rules, the number 7.39 is found as above and the number 0.135 is found opposite 2 of one of the left A scales on the LLO scale. Instead of a single setting of the hairline on the rule of the present invention, two settings are necessary on the prior art rules and complicated rules of determining what scales apply are involved.

As illustrating the obtaining of a final result by continuous progressive manipulations of the new slide rule in the evaluation of expressions involving logarithms of numbers less than unity, which evaluation would require resetting in the use of any prior art slide rule, the following examples are given:

*Example 12.*—Evaluate $$\frac{17 \log_e 0.04}{\sqrt{31}}$$

*Solution.*—To 0.04 on LLO3 scale

Draw 31 on B (right) scale,
Push indicator to 17 on CF scale and
Read 9.83 on DF scale.

*Example 13.*—Evaluate $$\frac{\log_e 0.7145 \sin 45°}{\cos 70°}$$

*Solution.*—To 0.7145 on LLO2 scale

Draw 70° on S (red),
Push indicator to 45 on S scale and
Read .6955 on D scale

*Example 14.*—Evaluate $$\frac{\cos 79° 05' \log_e 0.9525 \sec 70° 10'}{\sin 55°}$$

*Solution.*—To 0.9525 on LLO1

Draw 55° on S,
Push hairline to 79° 05' on S (red),
Draw 70° 10' on S (red) to hairline and
Read at the index .03319 on D.

*Example 15.*—Evaluate $\sqrt{16.2} \log_e 0.0074 \csc 60°$

*Solution.*—To 0.0074 on LLO3 scale

Draw 60° on S scale,
Push hairline to 16.2 on B and
Read 22.8 on D scale.

Observe that it is impossible, by means of prior art rules of any kind, to evaluate each of the expressions in Examples 12, 13, 14 and 15 by continuous progressive manipulations, that is by a process requiring generally one but no more than one movement either of the hairline or of the slide for each number in the expression to be computed.

*Example 16.*—Evaluate $$e^{\frac{-\log_e 0.72 \tan 25°}{\sin 40° \sqrt{35}}}$$

*Solution.*—Push hairline to 0.72 on scale LLO2,

Draw 40° of S scale under the hairline,
Push the hairline to 25° of T scale,
Draw 35 of B (right) under the hairline,
Push the hairline to index of C,
At the hairline read 1.0412 on LL1 scale.

*Example 17.*—Evaluate $$e^{\frac{-\log_e 1.311 \tan 40°}{\cos 47° \frac{1}{3.7\pi} \cot 35°}}$$

*Solution.*—Push the hairline to 1.311 on scale LL2,

Draw 47° of scale S (red) under the hairline,
Push the hairline to 40° on scale T,
Draw 3.7 of scale CIF under the hairline,
Push the hairline to 35° of scale T,
At the hairline on scale LLO3 read 0.0664.

*Example 18.*—Evaluate $$\frac{(\log_e 0.65)(\sqrt{23})}{e^{\sin 40°}}$$

*Solution.*—Push hairline to 0.65 on scale LLO2,

Draw 40° of S scale under the hairline,
Push the hairline to 23 on B right,
At the hairline read 0.0401 on scale LLO3.

Two resettings would be necessary to perform this evaluation by means of the slide rule of Patent No. 2,170,144.

Another feature of improvement over the above mentioned prior patent lies in the disposition of the sine, co-sine, tangent and co-tangent numbers. In said prior patent, the co-sine and co-tangent numbers are in red and are to the right of the markings, whereas the sine and tangent numbers are in black and to the left of the markings, adjacent numbers being inclined toward the common marking. As shown in Figure 2, the co-sine and co-tangent numbers, which are in red, are placed at the left of the markings, while the sine and tangent numbers, which are in black, are placed to the right of the markings, and adjacent numbers are inclined away from the common marking. The transposition of the associated numbers and their upward divergence greatly facilitate accurate settings.

It is well understood that in slide rules the slide may be rectilinearly movable in a slot, as herein shown, or in a channel, or the rule may be in disc or cylinder form with a rotary slide member. When in the following claims a slide member is recited, it is to be understood that it may be of any of the known types. Variations from the specific disclosure herein, for example in the relative positioning of scales, are possible and are contemplated in the claims which follow.

This is a division of application Serial No. 559,020 filed October 17, 1944, entitled Slide Rule, now Patent 2,422,649, granted June 17, 1947.

What is claimed is:

In a slide rule, a trigonometric scale having graduations designated on the right by a series of numbers ascending from left to right and on the left by a complementary series of numbers descending from left to right, the numbers associated with each graduation diverging upwardly with respect thereto.

JAMES R. BLAND.

REFERENCES CITED

The following references are of record in the file of this patent:

UNITED STATES PATENTS

| Number | Name | Date |
| --- | --- | --- |
| 2,168,056 | Bernegau | Aug. 1, 1939 |